(12) United States Patent
Achuthan Rajendrababu et al.

(10) Patent No.: US 11,233,912 B2
(45) Date of Patent: Jan. 25, 2022

(54) DISPLAY DEVICES TO PROVIDE INFORMATION OF THE CURRENT STATUS OF THE ELECTRONIC DEVICE

(71) Applicant: Hewlett-Packard Development Company, L.P., Spring, TX (US)

(72) Inventors: Anoop Achuthan Rajendrababu, Boise, ID (US); Kathryn Rachael Williams, Bosie, ID (US); Marcos Teres Nieto, Boise, ID (US); Steven Holland, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,640

(22) PCT Filed: Jun. 11, 2018

(86) PCT No.: PCT/US2018/036930
§ 371 (c)(1),
(2) Date: Oct. 14, 2020

(87) PCT Pub. No.: WO2019/240761
PCT Pub. Date: Dec. 19, 2019

(65) Prior Publication Data
US 2021/0152702 A1    May 20, 2021

(51) Int. Cl.
*G06F 3/12*    (2006.01)
*H04N 1/00*    (2006.01)
*G09G 3/20*    (2006.01)

(52) U.S. Cl.
CPC .......... *H04N 1/00477* (2013.01); *G09G 3/20* (2013.01); *H04N 1/00408* (2013.01); *H04N 1/00493* (2013.01); *H04N 1/00506* (2013.01); *G09G 2370/16* (2013.01)

(58) Field of Classification Search
CPC ........... H04N 1/00477; H04N 1/00408; H04N 1/00493; H04N 1/00506; G06G 3/20; G09G 2370/16
USPC ......................................... 358/1.1–1.18, 474
See application file for complete search history.

(56) References Cited

U.S. PATENT DOCUMENTS

| | | |
|---|---|---|
| 7,099,034 B2 | 8/2006 | Anderson et al. |
| 7,299,490 B2 | 11/2007 | Berkema et al. |
| 7,657,193 B2 | 2/2010 | Wada |
| 7,729,622 B2 | 6/2010 | Yamanaka |
| 9,503,592 B2 | 11/2016 | Fein |
| 9,591,175 B2 | 3/2017 | Bealty |
| 9,606,696 B2 | 3/2017 | Oguma |
| 9,728,068 B2 | 8/2017 | Engelhard |
| 9,906,659 B2 | 2/2018 | Shimomura |
| 2007/0285701 A1 | 12/2007 | Ohta et al. |
| 2008/0106762 A1 | 5/2008 | Mullender et al. |

(Continued)

*Primary Examiner* — Gabriel I Garcia
(74) *Attorney, Agent, or Firm* — HP Inc. Patent Department

(57) ABSTRACT

An example display system includes a power source, a communication transceiver operatively connected to the power source and wirelessly linked to a host device, a processor to receive computer-executable data signals from the host device through the communication transceiver, and a display device to receive the data signals from the processor and display status information of an attached compartment of the host device.

14 Claims, 11 Drawing Sheets

(56) References Cited

U.S. PATENT DOCUMENTS

| | | | |
|---|---|---|---|
| 2009/0009797 A1* | 1/2009 | Nimura | G06F 3/1207 358/1.15 |
| 2009/0147393 A1* | 6/2009 | Hakamata | G06F 1/3268 360/69 |
| 2017/0134609 A1 | 5/2017 | Park et al. | |
| 2017/0190186 A1 | 7/2017 | Kubota | |
| 2018/0270365 A1* | 9/2018 | Ishida | H04N 1/00496 |

* cited by examiner

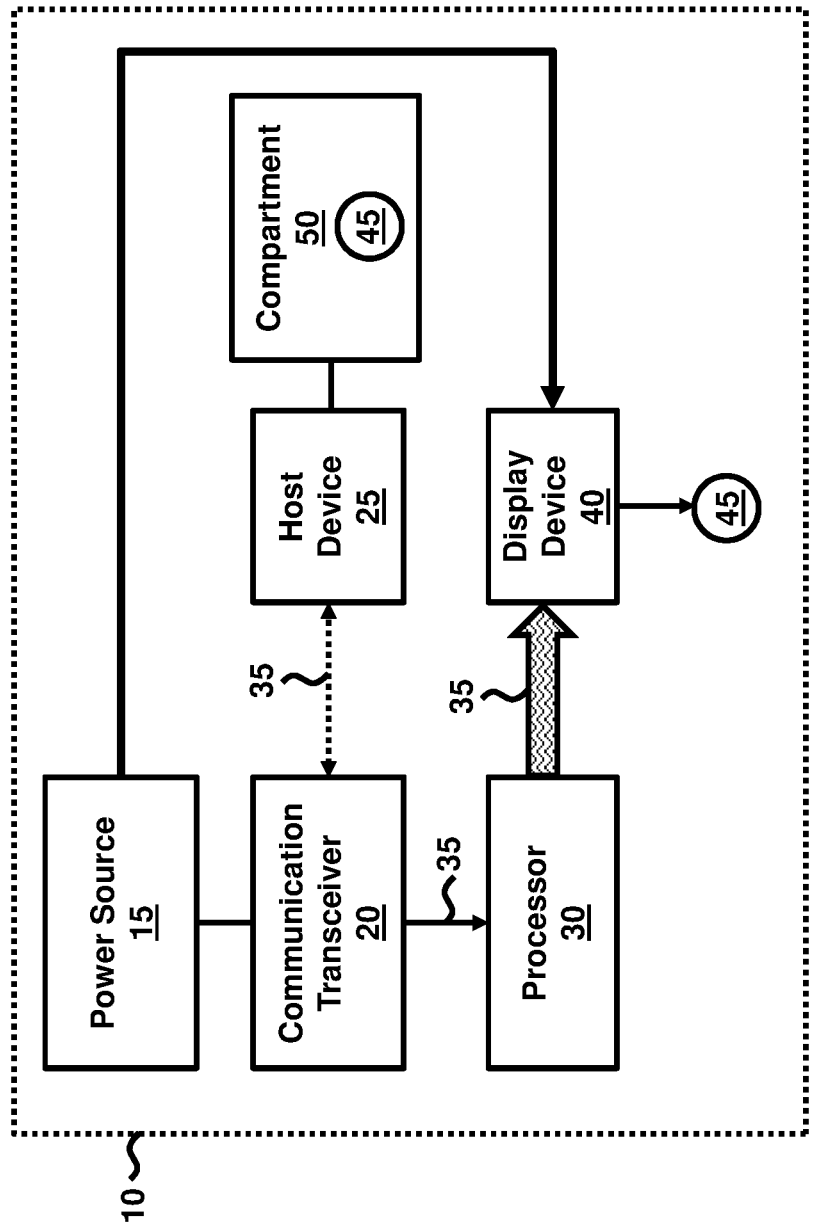

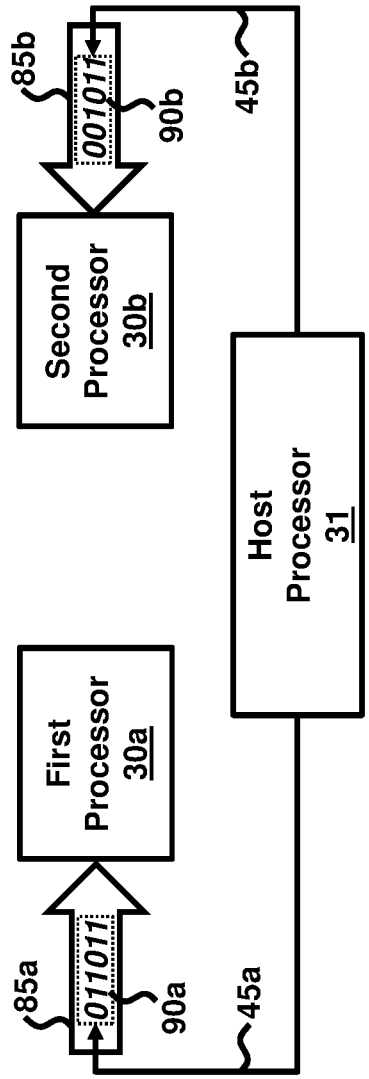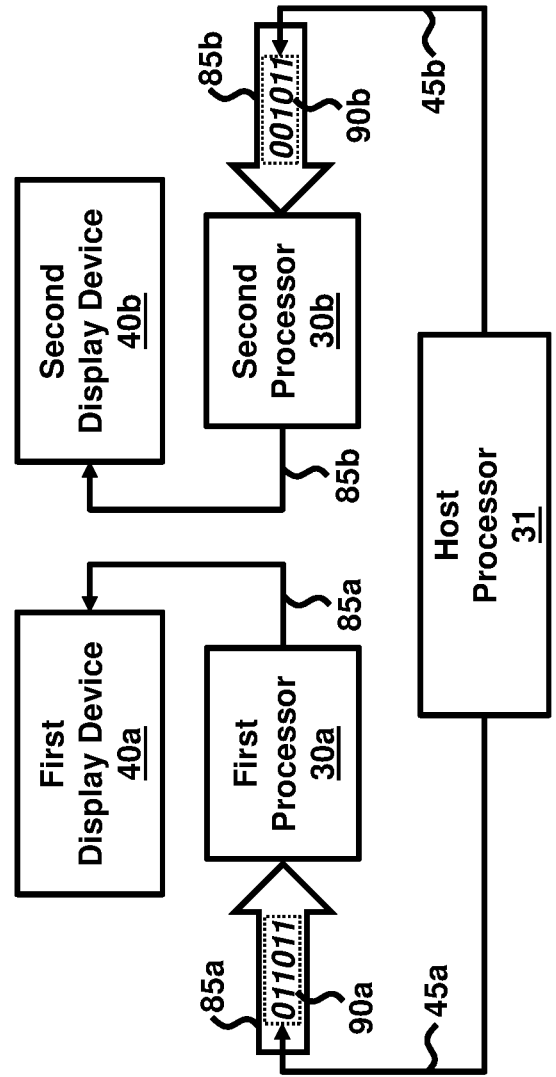

DISPLAY DEVICES TO PROVIDE INFORMATION OF THE CURRENT STATUS OF THE ELECTRONIC DEVICE

BACKGROUND

Electronic devices such as printers, scanners, and copiers contain different types of consumables such as ink cartridges, print medium, and other components used to perform various functions. These consumables, among others, are often contained within various compartments of the electronic devices. Electronic devices may further include a single user interface display to provide information about the current status of the electronic device.

BRIEF DESCRIPTION OF THE DRAWINGS

The following detailed description references the drawings, in which:

FIG. 5A is a block diagram illustrating the display device of FIG. 1 consuming power, according to an example.

FIG. 7 is a block diagram illustrating processors of the electronic device of FIG. 6 receiving frame buffers, according to an example.

FIG. 8 is a block diagram illustrating the processors of FIG. 7 refreshing display devices, according to an example.

Figure 1:
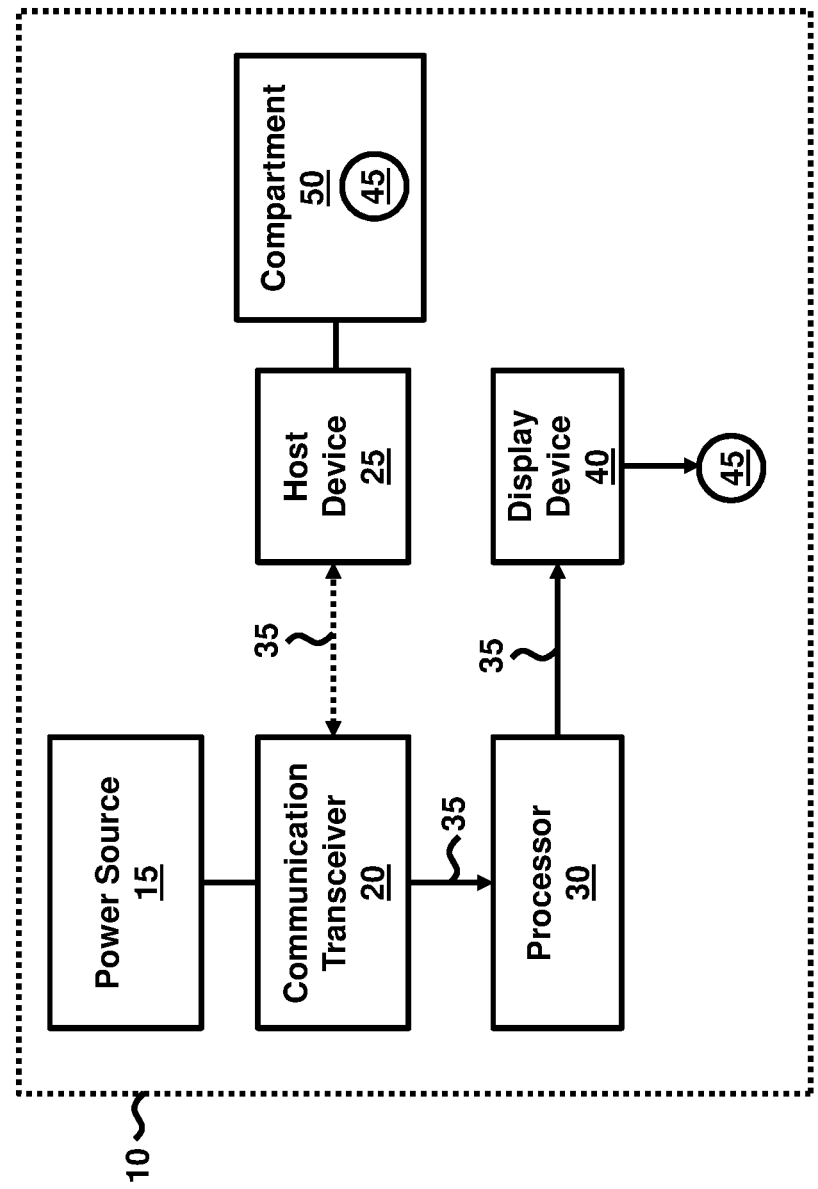
FIG. 1 is a block diagram illustrating a display system to provide status information of a device, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In typical settings, users of printers, copiers, scanners, and other similar electronic devices may engage the electronic device in order to ascertain the current status of the electronic device including its various consumables contained in the device. Often, a single user interface provides information regarding the various consumables contained in the device, and a user typically scrolls through various screen outputs in order to locate information regarding a particular consumable. This process of scrolling through various menus and outputs can be time-consuming and may result in user dissatisfaction or misreading the results displayed due to confusion of the plethora of data being displayed on the single user interface screen. Other solutions to this problem may utilize simple hand placed stickers with printed or handwritten notes affixed at various locations on the electronic device. For example, if the ink cartridge is running low on a printer, a user may simply place a sticker or note on the machine indicating "10%", etc. suggesting that there remains only 10% of ink in the ink cartridge of the machine. Such primitive solutions are largely inefficient and may be prone to errors and misinterpretation by the user at a subsequent time or by other others. Furthermore, new stickers or notes must be affixed each time there is an update to the status of the machine.

In order to address this, the examples described below provide electronic display systems that are attached to an electronic device such as a printer. In some examples, the electronic displays may be electronic ink (e-ink) panels or liquid-crystal display (LCD) panels, and include a battery that can be rechargeable, communication receiver, and embedded firmware to interact with the printer to receive messages/signals to display. The electronic displays provide status information related to the compartment to which the electronic displays are attached. The electronic displays allow a user to quickly ascertain the status of a particular compartment; e.g., amount of paper remaining, ink level, paper jam, location of print job output, etc. without having to use a common user interface associated with the printer. Accordingly, the electronic displays can physically show where the problem is to a user, which decreases the time required to resolve a particular issue. As such, the examples described below improve the user's convenience and accessibility with respect to the electronic device.

In some examples, the various devices and processors described herein and/or illustrated in the figures may be embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such Oracle® relational databases), the data objects can be configured as a table or column. Other configurations include specialized objects, distributed objects, object-oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

FIG. 1 is a block diagram illustrating a display system 10 comprising a power source 15. In some examples, the power source 15 may comprise a direct current source such as a battery or solar cell, or may include an alternating current source. In an example where the power source 15 is a battery, the battery may be a low power device; e.g., approximately a 2.33 mA device, although other capacities and configurations are possible. Furthermore, the power source 15 may be rechargeable, according to an example. The display system 10 includes a communication transceiver 20 operatively connected to the power source 15 and wirelessly linked to a host device 25. The communication transceiver 20 may transmit and/or receive communication signals; e.g., computer-executable data signals 35 as described below, utilizing any suitable communication protocol including Bluetooth®, TCP/IP, and instant messaging protocols, for example. In some examples, the host device 25 may comprise a printer, scanner, copier, or multifunction device containing a combination of printing, scanning, and copying functionalities. For example, the host device 25 may contain one or more scanning modules to perform a digital scan of a print medium. As referred to herein, the term printable or print medium or media may refer to one or more sheets of paper or any other media suitable for insertion into the host device 25 such as a printer, scanner, or copier. The print medium may be any type of print medium including paper, photopolymers, thermopolymers, plastics, composite, metal, wood, etc., and may include any suitable feature including the size, shape, material, thickness, or any other quality suitable for placement in the host device 25.

The display system 10 includes a processor 30 to receive computer-executable data signals 35 from the host device 25 through the communication transceiver 20. In some examples, the processor 30 may comprise a central processing unit (CPU) of the display system 10. In other examples the processor 30 may be a discrete component independent of other processing components in the display system 10. In other examples, the processor 30 may be a microprocessor, microcontroller, hardware engine, hardware pipeline, and/or other hardware-enabled device suitable for receiving, processing, operating, and performing various functions required by the display system 10 and/or the host device 25. The processor 30 may be provided in the display system 10, coupled to the display system 10, or communicatively linked to the display system 10 and/or host device 25 from a remote networked location according to various examples. The computer-executable data signals 35 may be electronic signals, optical signals, or magnetic signals, according to various examples. Additionally, the computer-executable data signals 35 may be analog or digital signals, according to some examples.

The display system 10 includes a display device 40 to receive the data signals 35 from the processor 30 and display status information 45 of an attached compartment 50 of the host device 25. In examples, the display device 40 may be any suitable type of electronic display screen capable of displaying information in a format discernible to a user. The display device 40 may have any suitable size and shape. In an example, the display device 40 may be approximately four inches in diagonal size and have an overall approximate size of 3"×5"×0.1", although other sizes are possible. Examples of the type of display device 40 that may be utilized are described below. In some examples, the status information 45 may comprise any type of information pertaining to the consumables housed in the attached compartment 50 of the host device 25. For example, if the consumable is an ink cartridge, then the status information 45 may include the percentage of ink remaining, the color of ink, the type/brand of ink cartridge, etc. In another example, if the consumable is the print medium, then the status information 45 may include the size, type, quantity remaining, orientation, etc. of the print medium or whether there is a jam of the print medium in the compartment 50, etc. Accordingly, the status information 45 may relate to any suitable type of information that affects the function and/or operation of the host device 25. Furthermore, the status information 45 may be provided according to a user's configuration such that the status information 45 may be changed and updated and uniquely assigned based on a user's configuration.

Figure 2:
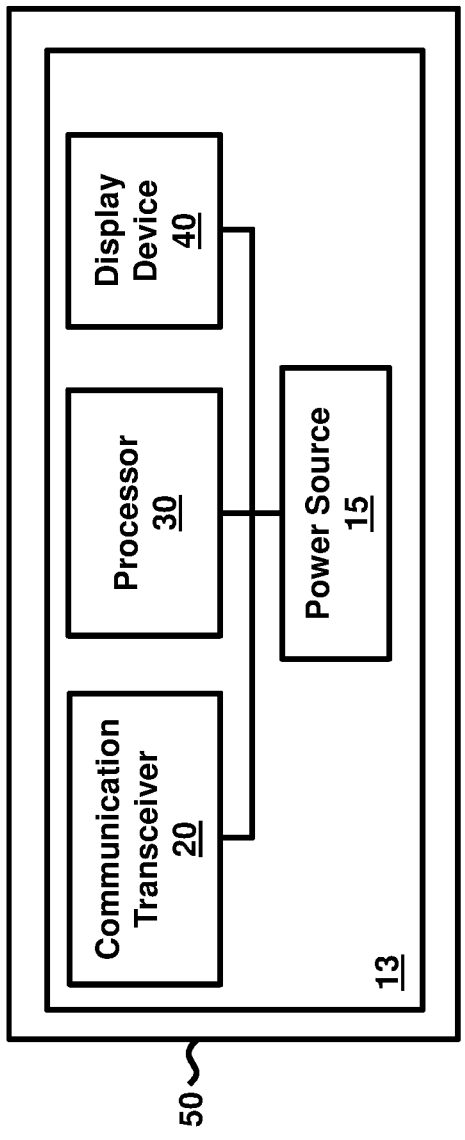
FIG. 2 is a block diagram illustrating a module of the display system of FIG. 1, according to an example.

In examples, the compartment 50 may refer to any type of location, section, area, panel, tray, door, module, component, etc. that is part of the host device 25 or operatively connected to the host device 25. For example, the compartment 50 may refer to the tray for holding print medium, or the slots for holding ink cartridges, or the bin for containing scanning modules or print medium rollers, etc. Accordingly, the compartment 50 is not limited to a specific type or configuration of a physical structure. The display system 10 may include more than one compartment 50, according to an example, such that each compartment 50 contains its own power source 15, communication transceiver 20, processor 30, and display device 40. Moreover, each compartment 50 provides status information 45 related to that particular compartment 50 and corresponding consumable(s). Furthermore, each compartment 50 can be given a customized name that is easily identifiable and discernible by a user, which allows a user to quickly locate the compartment 50 and know what type of consumable that compartment 50 contains. The combined power source 15, communication transceiver 20, processor 30, and display device 40 may be arranged in a single module 13 connected to each compartment 50, as shown in FIG. 2, with reference to FIG. 1. In some examples, the power source 15 may be coupled to each of the communication transceiver 20, processor 30, and display device 40 through direct or indirect connection.

Figure 3:
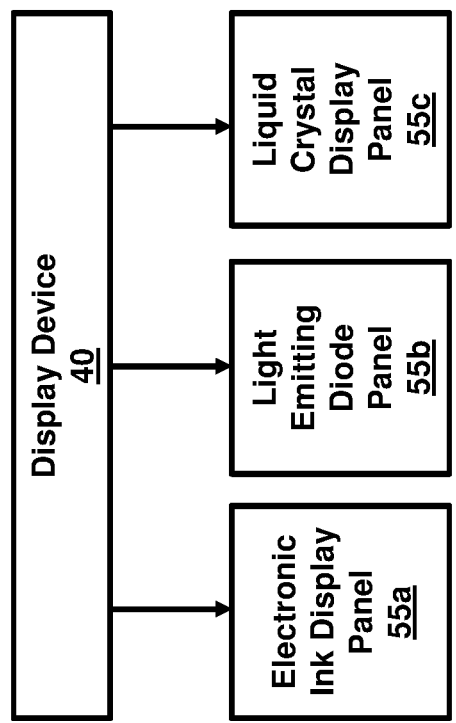
FIG. 3 is a block diagram illustrating the display device of FIG. 1 with different types of display panels, according to an example.

FIG. 3, with reference to FIGS. 1 and 2, is a block diagram illustrating that the display device 40 comprises any of an electronic ink display panel 55a, a light emitting diode display panel 55b, and a liquid-crystal display panel 55c. For example, the electronic ink display panel 55a may be similar to display panels available from E Ink Holdings Inc., Taiwan, utilizing microcapsules containing positively charge white particles and negatively charged black particles that move to the top of the microcapsule, and thus become visible to a user, upon being charged by an electric field. In an example, the light emitting diode (LED) display panel 55b may be any suitable type of LED display containing an array of light-emitting diodes as pixels for the display. According to an example, the liquid-crystal display (LCD) panel 55c may be any suitable type of LCD display containing light-modulating properties of liquid crystals for the display.

Figure 4:
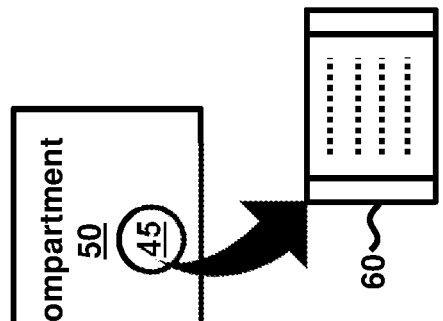
FIG. 4 is a block diagram illustrating that the status information of a compartment of the electronic device of FIG. 1 includes programmable information, according to an example.

FIG. 4, with reference to FIGS. 1 through 3, is a block diagram illustrating that the status information 45 comprises programmable information 60 associated with an operation of the attached compartment 50 of the host device 25. In examples, the programmable information 60 may be uploaded through firmware updates to the processor 30. The programmable information 60 may include the status data and/or configuration data associated with the corresponding compartment 50 to which the processor 30 and/or display device 40 is operatively connected. For example, the status data may include the current operational health of the compartment 50 and/or consumables contained therein. Additionally, the configuration data may include necessary software and hardware configurations and protocols required to perform the functions associated with the consumables contained within a particular compartment 50.

FIG. 5A, with reference to FIGS. 1 through 4, is a block diagram illustrating that the display device 40 is to consume power from the power source 15 only when the data signals 35 are updated on the display device 40. In this regard, the display device 40 may operate in a low power state, yet may be always on and operating. For example, if the power source 15 is a battery, then, in order to conserve battery strength, the display device 40 does not draw power from the power source 15; e.g., battery, unless data signals 35 are being transmitted to the display device 40 by way of the communication transceiver 20. Accordingly, the display device 40 will display the last known status information 45 pertaining to the corresponding compartment 50, and in this state of operation, the display device 40 does not consume power from the power source 15. Once, data signals 35 are updated on the display device 40; e.g., through the communication transceiver 20, then the status information 45 may change based on the updated programmable information 60 processed by the processor 30, and in this state of operation, the display device 40 consumes power from the power source 15.

Figure 5B:
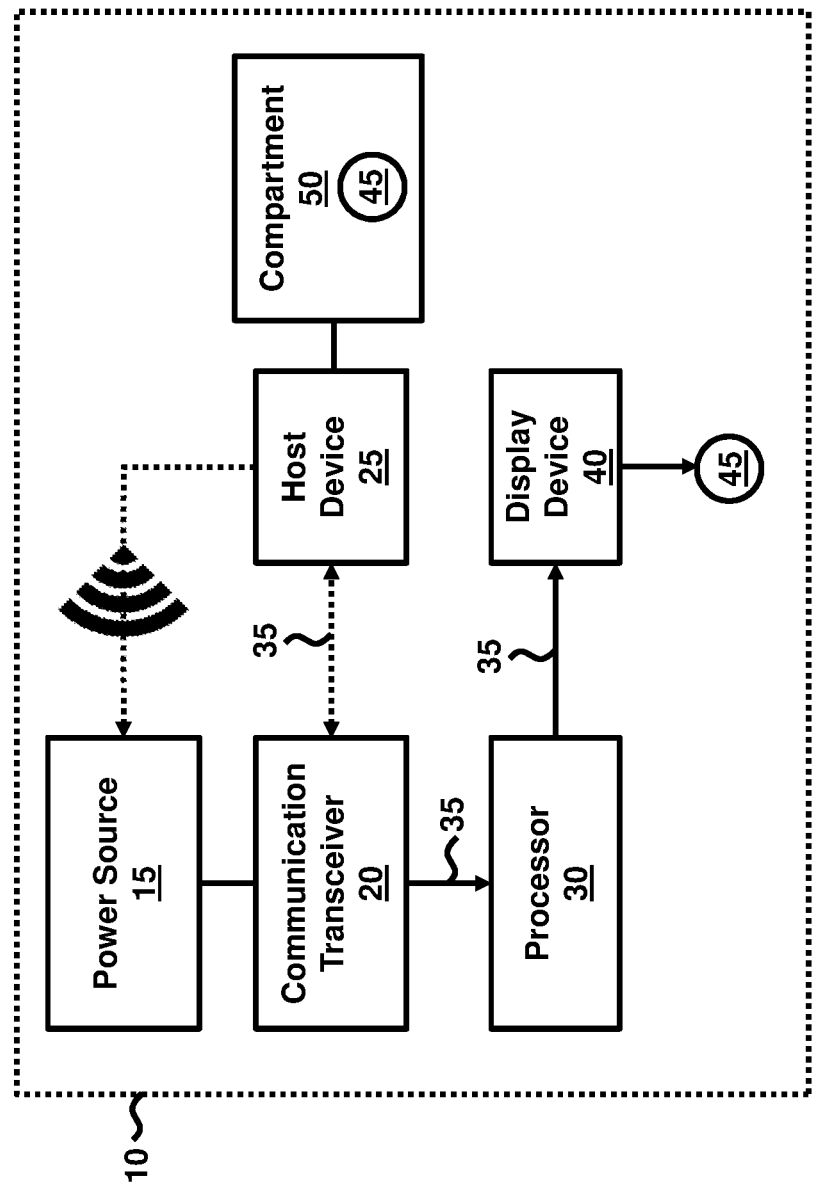
FIG. 5B is a block diagram illustrating the power source of the display system of FIG. 1 being inductively charged, according to an example.

FIG. 5B, with reference to FIGS. 1 through 5A, is a block diagram illustrating that the power source 15 is inductively charged by the host device 25. In this regard, the power source 15 may be wirelessly charged by the host device 25 using electromagnetic induction in which energy is transferred from the host device 25 to the power source 15 using an electromagnetic field. This permits the power source 15 to be charged by the host device 25 without requiring changing or replacing the power source 15. Moreover, this obviates the need for a visible charging connection or cable for powering the power source 15.

Figure 6:
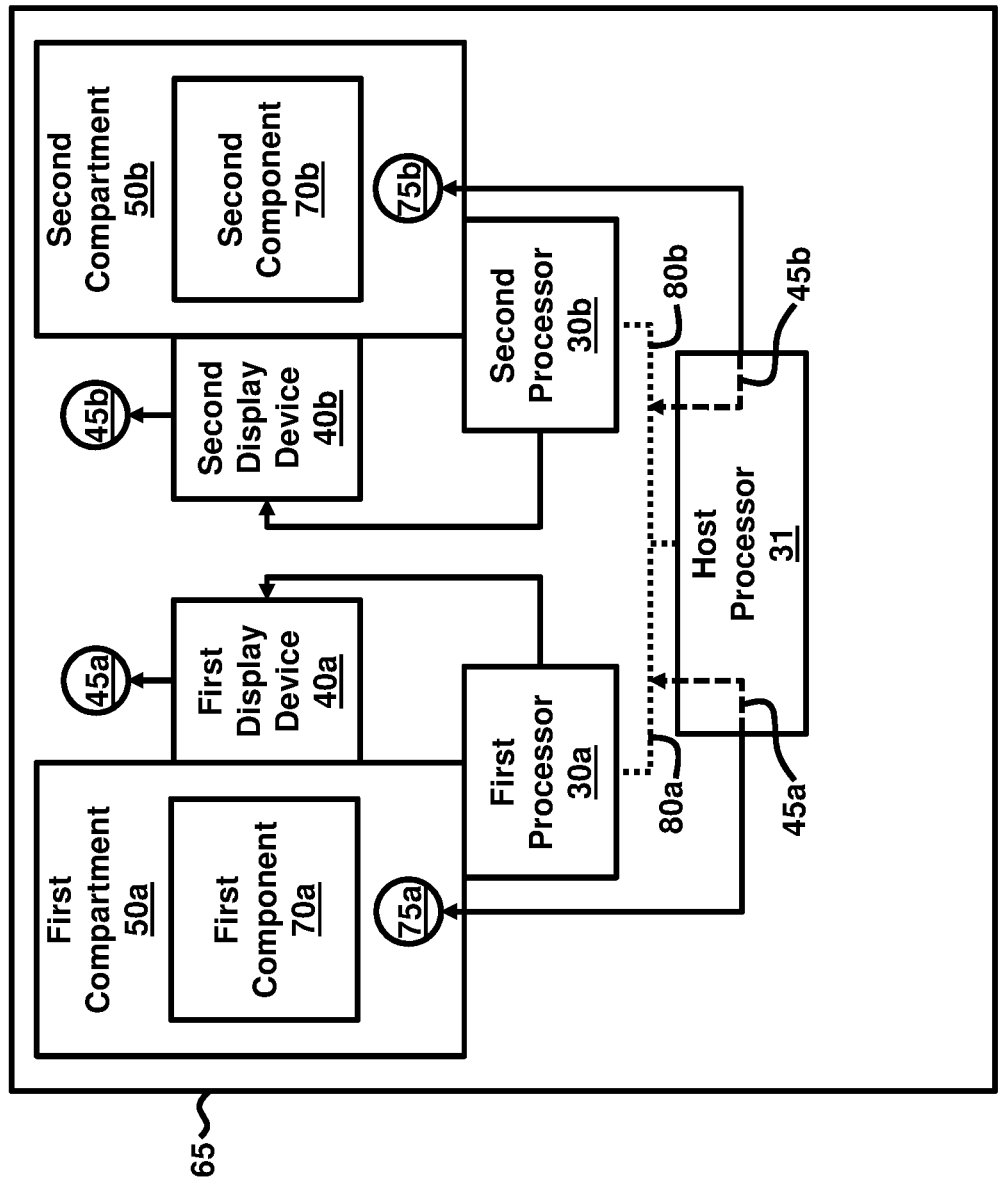
FIG. 6 is a block diagram illustrating an electronic device to provide status information of attached compartments, according to an example.

FIG. 6, with reference to FIGS. 1 through 5B, is a block diagram illustrating an electronic device 65 comprising a first compartment 50a to house a first component 70a for operating the electronic device 65, and a second compartment 50b to house a second component 70b for operating the electronic device 65. In an example, the electronic device 65 may comprise a printer, scanner, copier, or multifunction device containing a combination of printing, scanning, and copying functionalities. For example, the electronic device 65 may contain one or more scanning modules to perform a digital scan of a print medium. The example shown in FIG. 6 illustrates a first compartment 50a and a second compartment 50b for ease of illustration. However, the electronic device 65 may include any number of compartments and corresponding components. In examples, the first compartment 50a and second compartment 50b may refer to any type of location, section, area, panel, tray, door, module, component, etc. that is part of the electronic device 65 or operatively connected to the electronic device 65.

In non-limiting examples, the first compartment 50a and second compartment 50b may refer to the tray for holding print medium, or the slots for holding ink cartridges, or the bin for containing scanning modules or print medium rollers, etc. Accordingly, the first compartment 50a and second compartment 50b are not limited to a specific type or configuration of a physical structure. In examples, the first component 70a and the second component 70b may refer to any type of consumable, device, structure, element, mechanism, module, or any other type of component that is used to perform the functions and operations of the electronic device 65. For example, the first component 70a may be a print medium and the second component 70b may be the ink contained in an ink cartridge, although other types of components may be applicable.

The electronic device 65 includes a host processor 31 to detect an operational status 75a, 75b of the first compartment 50a and the second compartment 50b, respectively. In some examples, the host processor 31 may comprise a CPU of the electronic device 65. In other examples the host processor 31 may be a discrete component independent of other processing components in the electronic device 65. In other examples, the host processor 31 may be a microprocessor, controller, hardware engine, hardware pipeline, and/or other hardware-enabled device suitable for receiving, processing, operating, and performing various functions required by the electronic device 65. The host processor 31 may be provided in the electronic device 65, coupled to the electronic device 65, or communicatively linked to the electronic device 65 from a remote networked location according to various examples. Firmware updates may be provided in the host processor 31 such that the firmware updates may include data related to the current functioning and operational status of the electronic device 65 including all components of the electronic device 65. For example, the host processor 31 may detect the current operational status 75a, 75b of the first compartment 50a and second compartment 50b, respectively, of the electronic device 65, and update the firmware accordingly based on the detected operational status 75a, 75b.

In some examples, the operational status 75a, 75b may comprise any type of information pertaining to the first component 70a and/or the second component 70b housed in the attached first compartment 50a and/or second compartment 50b, respectively, of the electronic device 65. For example, if the first component 70a or the second component 70b is an ink cartridge, then the operational status 75a, 75b, respectively, may include the percentage of ink remaining, the color of ink, the type/brand of ink cartridge, etc. In another example, if the first component 70a or the second component 70b is the print medium, then the operational status 75a, 75b, respectively, may include the size, type, quantity remaining, orientation, etc. of the print medium or whether there is a jam of the print medium in the first compartment 50a and/or second compartment 50b, etc. Accordingly, the operational status 75a, 75b may relate to any suitable type of information that affects the function and/or operation of the electronic device 65. Furthermore, the operational status 75a, 75b may include both status data and configuration data associated with the corresponding first compartment 50a and/or second compartment 50b to which the operational status 75a, 75b relates. For example, the status data may include the current operational health of the first compartment 50a or second compartment 50b and/or the first component 70a or second component 70b, respectively, contained therein. Additionally, the configuration data may include necessary software and hardware configurations and protocols required to perform the functions associated with the first component 70a or second component 70b contained within the first compartment 50a or second compartment 50b, respectively.

The electronic device 65 includes a first processor 30a wirelessly connected to the host processor 31 and coupled to the first compartment 50a. The first processor 30a is to receive a first signal 80a from the host processor 31 containing first operational status information 45a associated with the first compartment 50a. The electronic device 65 also includes a second processor 30b wirelessly connected to the host processor 31 and coupled to the second compartment 50b, wherein the second processor 30b is to receive a second signal 80b from the host processor 31 containing second operational status information 45b associated with the second compartment 50b. In examples, each of the first processor 30a and second processor 30b may comprise a CPU of the corresponding first compartment 50a and second compartment 50b, respectively. In other examples the first processor 30a and second processor 30b may be a discrete component independent of other processing components in the electronic device 65. In other examples, the first processor 30a and second processor 30b may each be a microprocessor, controller, hardware engine, hardware pipeline, and/or other hardware-enabled device suitable for receiving, processing, operating, and performing various functions required by the electronic device 65. The first processor 30a and second processor 30b may each be provided in the electronic device 65, coupled to the electronic device 65, or communicatively linked to the electronic device 65 from a remote networked location according to various examples.

The first signal 80a and second signal 80b may each be electronic signals, optical signals, or magnetic signals, according to various examples. Additionally, the first signal 80a and second signal 80b may each be analog or digital wireless signals, according to some examples. In examples, the first operational status information 45a and second operational status information 45b may each comprise any type of information pertaining to the first component 70a or second component 70b housed in the attached first compartment 50a or second compartment 50b, respectively of the electronic device 65. In some examples, the operational status 75a may comprise the first operational status information 45a, and the operational status 75b may comprise the second operational status information 45b. In other examples, the operational status 75a may be the same as the first operational status information 45a, and the operational status 75b may be the same as the second operational status information 45b. The difference between the operational status 75a and first operational status information 45a, and the operational status 75b and the second operational status information 45b may refer to the manner in which the data is presented, compiled, and/or processed by the first processor 30a, second processor 30b, and/or host processor 31. In other examples, the operational status 75a, 75b may refer to an analog signal while the first operational status information 45a and second operational status information 45b may refer to the digital signal that corresponds to the analog version of the operational status 75a, 75b. In still other examples, the operational status 75a, 75b may include both status data and configuration data as described above, whereas the first operational status information 45a and second operational status information 45b may be a compilation of the status data and configuration data.

The electronic device 65 includes a first display device 40a operatively connected to the first processor 30a. The first display device 40a is to display the first operational status information 45a associated with the first compartment 50a. The electronic device also includes a second display device 40b operatively connected to the second processor 30b. The second display device 40b is to display the second operational status information 45b associated with the second compartment 50b. In examples, the first display device 40a and second display device 40b may each be any suitable type of electronic display screen capable of displaying the first operational status information 45a and second operational status information 45b, respectively, in a format discernible to a user. The first display device 40a and second display device 40b may have any suitable size and shape. In an example, the first display device 40a and second display device 40b may each be approximately four inches in diagonal size and have an overall approximate size of 3"×5"×0.1", although other sizes are possible, although other sizes are possible. According to some examples, the first display device 40a and second display device 40b may be an electronic ink display panel 55a, a light emitting diode display panel 55b, and a liquid-crystal display panel 55c, as described above with respect to FIG. 3. Moreover, other types of panel displays may also be utilized in accordance with the examples described herein. As such, the first display device 40a and second display device 40b may be any suitable type of display screen that is removably attachable to the first compartment 50a and second compartment 50b, respectively, of the electronic device 65.

FIG. 7, with reference to FIGS. 1 through 6, is a block diagram illustrating that the first processor 30a is to receive a first frame buffer 85a containing a digital representation 90a of the first operational status information 45a from the host processor 31. Moreover, the second processor 30b is to receive a second frame buffer 85b containing a digital representation 90b of the second operational status information 45b from the host processor 31. In an example, the first frame buffer 85a and second frame buffer 85b may comprise a portion of memory containing a complete frame of data input into the first display device 40a and second display device 40b, respectively. According to an example, the digital representation 90a of the first operational status information 45a and the digital representation 90b of the second operational status information 45b may each be a bitmap that drives the first display device 40a and second display device 40b. For example, the digital representation 90a 90b may be a pixel representation such that the entire display on the first display device 40a is one image and the entire display on the second display device 40b is one image.

FIG. 8, with reference to FIGS. 1 through 7, is a block diagram illustrating that the first processor 30a is to refresh the first display device 40a with the first frame buffer 85a, and the second processor 30b is to refresh the second display device 40b with the second frame buffer 85b. As such, the first frame buffer 85a and second frame buffer 85b contain the latest and most updated version of the first operational status information 45a and second operational status information 45b of the corresponding first compartment 50a containing the first component 70a, and the corresponding second compartment 50b containing the second component 70b, respectively. The first display device 40a and second display device 40b does not erase upon the occurrence of a powercycle or reboot. Thus, refreshing the first display device 40a and the second display device 40b with the first frame buffer 85a and second frame buffer 85b, respectively, allows the first display device 40 and second display device 40b to display the latest versions of the first operational status information 45a and second operational status information 45b, respectively. In FIGS. 7 and 8, the digital representation 90a of the first operational status information 45a and the digital representation 90b of the second operational status information 45b are depicted as a series of bit sequence numbers. However, this is merely for illustrative purposes only, and accordingly, the digital representation 90a, 90b may be characterized in any suitable type of digital format.

Figure 9:
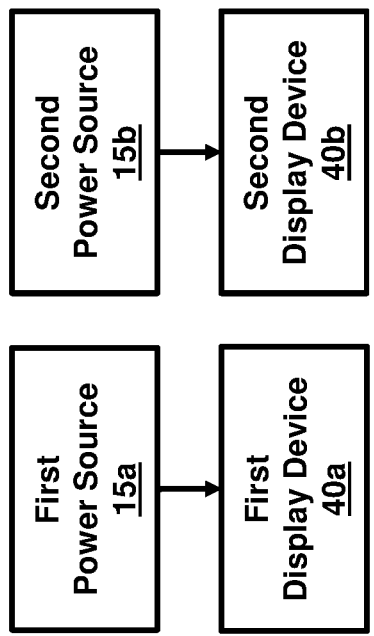
FIG. 9 is a block diagram illustrating the display devices of FIG. 6 being independently powered from one another, according to an example.

FIG. 9, with reference to FIGS. 1 through 8, is a block diagram illustrating that the first display device 40a and the second display device 40b are independently powered from one another by first power source 15a and second power source 15b, respectively. In this regard, the first display device 40a and second display device 40b are independent and autonomous to one another. Moreover, the first processor 30a and second processor 30b are also independent and autonomous to one another.

Figure 10:
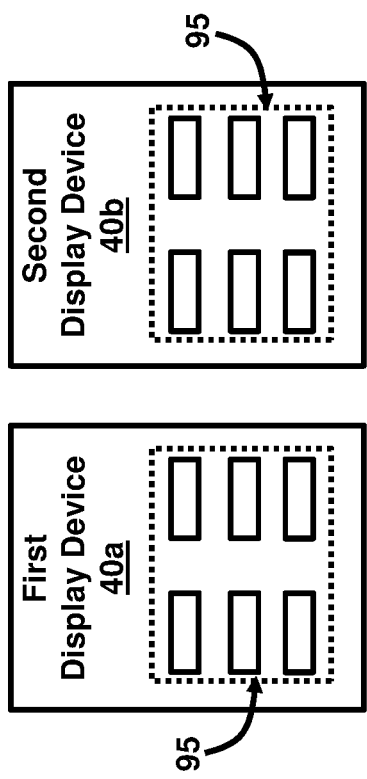
FIG. 10 is a block diagram illustrating the display devices of FIG. 6 displaying data fields, according to an example.

FIG. 10, with reference to FIGS. 1 through 9, is a block diagram illustrating that the first display device 40a and the second display device 40b are programmable to display a predetermined number of data fields 95. In an example, the data fields 95 may display the digital representation 90a first operational status information 45a and the digital representation 90b of the second operational status information 45b for the corresponding first display device 40a and second display device 40b, respectively. The data fields 95 may be arranged in any suitable position, shape, and configuration for display on the first display device 40a and second display device 40b. Moreover, in an example, the data fields 95 may provide any of text, symbols, animation, color coding, audio, video, and images.

Figure 11:
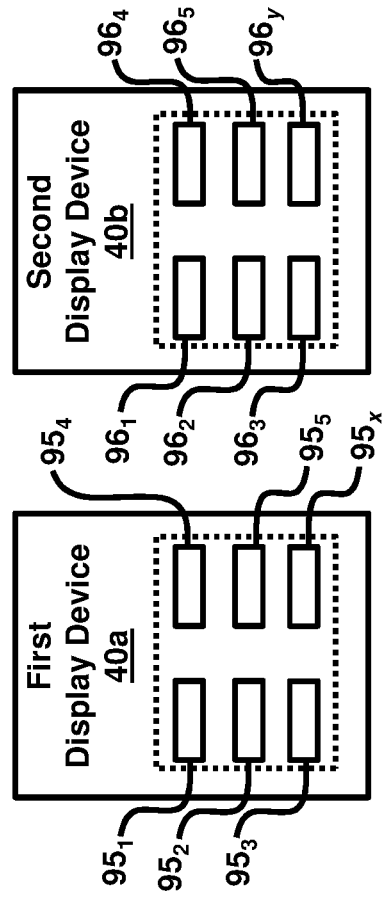
FIG. 11 is a block diagram illustrating the display devices of FIG. 6 displaying different data fields from one another, according to an example.

FIG. 11, with reference to FIGS. 1 through 10, is a block diagram illustrating that the first display device 40a and the second display device 40b are programmable to display different data fields $95_1 \ldots 95_x$, $96_1 \ldots 96_y$, from one another. In this regard, the first display device 40a is attached to a first compartment 50a containing a first component 70a, and the second display device 40b is attached to a second compartment 50b containing a second component 70b, in which the different data fields $95_1 \ldots 95_x$, $96_1 \ldots 96_y$, are associated with the information related to the first component 70a and second component 70b, respectively. In an example, the first component 70a may comprise print medium, and the second component 70b may comprise an ink cartridge. Accordingly, the data fields $95_1 \ldots 95_x$ associated with the first component 70a may refer to the tray number where the print medium is located, the amount of print medium remaining in the tray, the size or orientation of the print medium, and whether there is a jam of the print medium in the tray, etc. Moreover, the data fields $96_1 \ldots 96_y$, associated with the second component 70b may refer to the color of ink and amount of ink remaining, etc. in the ink cartridge.

Figure 12:
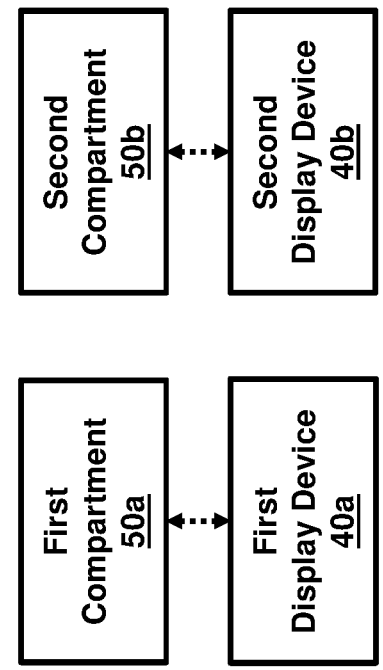
FIG. 12 is a block diagram illustrating the display devices being detachably connected to compartments of the electronic device of FIG. 6, according to an example.

FIG. 12, with reference to FIGS. 1 through 11, is a block diagram illustrating that the first display device 40a is detachably connected to the first compartment 50a. Furthermore, the second display device 40b is detachably connected to the second compartment 50b. According to some examples, the first display device 40a and second display device 40b may be detachably connected to the first compartment 50a and second compartment 50b, respectively, using any suitable connection mechanism including an adhesive, tape, Velcro® connector, screw, magnet, or any other suitable connection mechanism.

Figure 13:
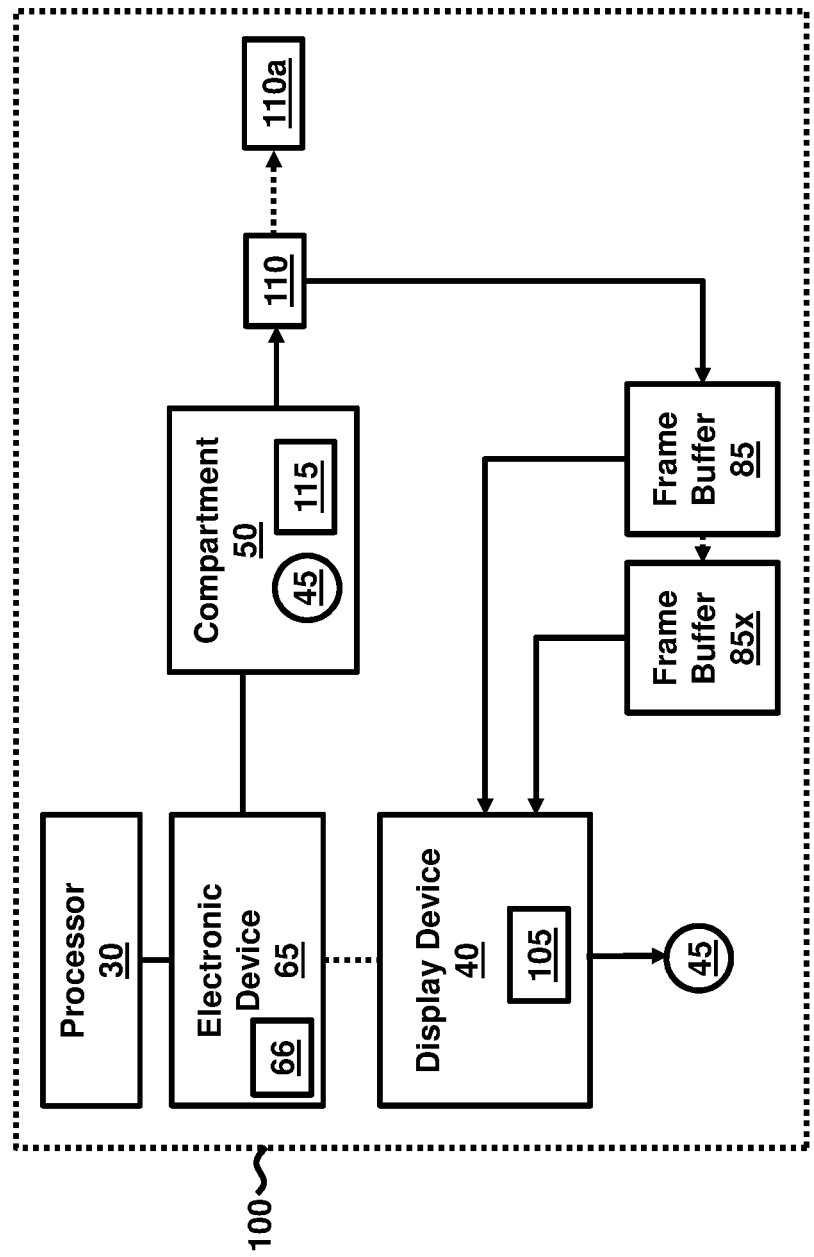
FIG. 13 is a block diagram illustrating a system of displaying status information of compartments of an electronic device, according to an example.

FIG. 13, with reference to FIGS. 1 through 12, is a block diagram illustrating a system 100 comprising an electronic device 65 wirelessly connected to a display device 40. The operations of the electronic device 65 may be driven by a processor 30 with a corresponding user interface 66 operatively connected to the electronic device 65. The display device 40 is to display status information 45 associated with an operation of an attached compartment 50 of the electronic device 65. The display device 40 may comprise an identification code 105. In an example, the identification code 105 may be a global unique identifier code associated with the display device 40. The status information 45 may comprise configuration parameters 110. In an example, the configuration parameters 110 may comprise any type of information pertaining to the consumables housed in the attached compartment 50 of the electronic device 65.

A frame buffer 85, which is created according to the configuration parameters 110, is transmitted to the display device 40. The configuration parameters 110 may be updated (e.g., updated configuration parameters 110a) based on a detected change in the operation of the attached compartment 50 of the electronic device 65. For example, if the attachment compartment 50 contains an ink cartridge, then as the ink contained therein is consumed, the updated configuration parameters 110a may reflect the updated change in the ink levels in the ink cartridge, etc. The frame buffer 85 may be updated (e.g., updated frame buffer 85x) according to the updated configuration parameters 110a. The updated frame buffer 85x may be transmitted to the display device 40 using processor 30; e.g., to refresh the display device 40 in order for the display device 40 to display the updated information provided by the updated configuration parameters 110a. The updated configuration parameters 110a may be based on satisfying a predetermined incremental threshold 115 in the detected change in the operation of the attached compartment 50 of the electronic device 65. For example, the predetermined incremental threshold 115 may be selected in 5% increments, etc. and each time the change in the operation of the attached compartment 50 reaches a 5% increment, then the configuration parameters 110 are updated (e.g., updated configuration parameters 110a) at that time. In another non-limiting example, if the compartment 50 contains print media, then as the print media is consumed, the predetermined incremental threshold 115 in the detected change in the amount of print media remaining in the compartment 50 may be set at 10% increments, etc., and each time 10% of the print media is consumed, the configuration parameters 110 are updated (e.g., updated configuration parameters 110a) at that time. This approach may conserve processing time and requirements of the display device 40 and/or electronic device 65.

Figure 14:
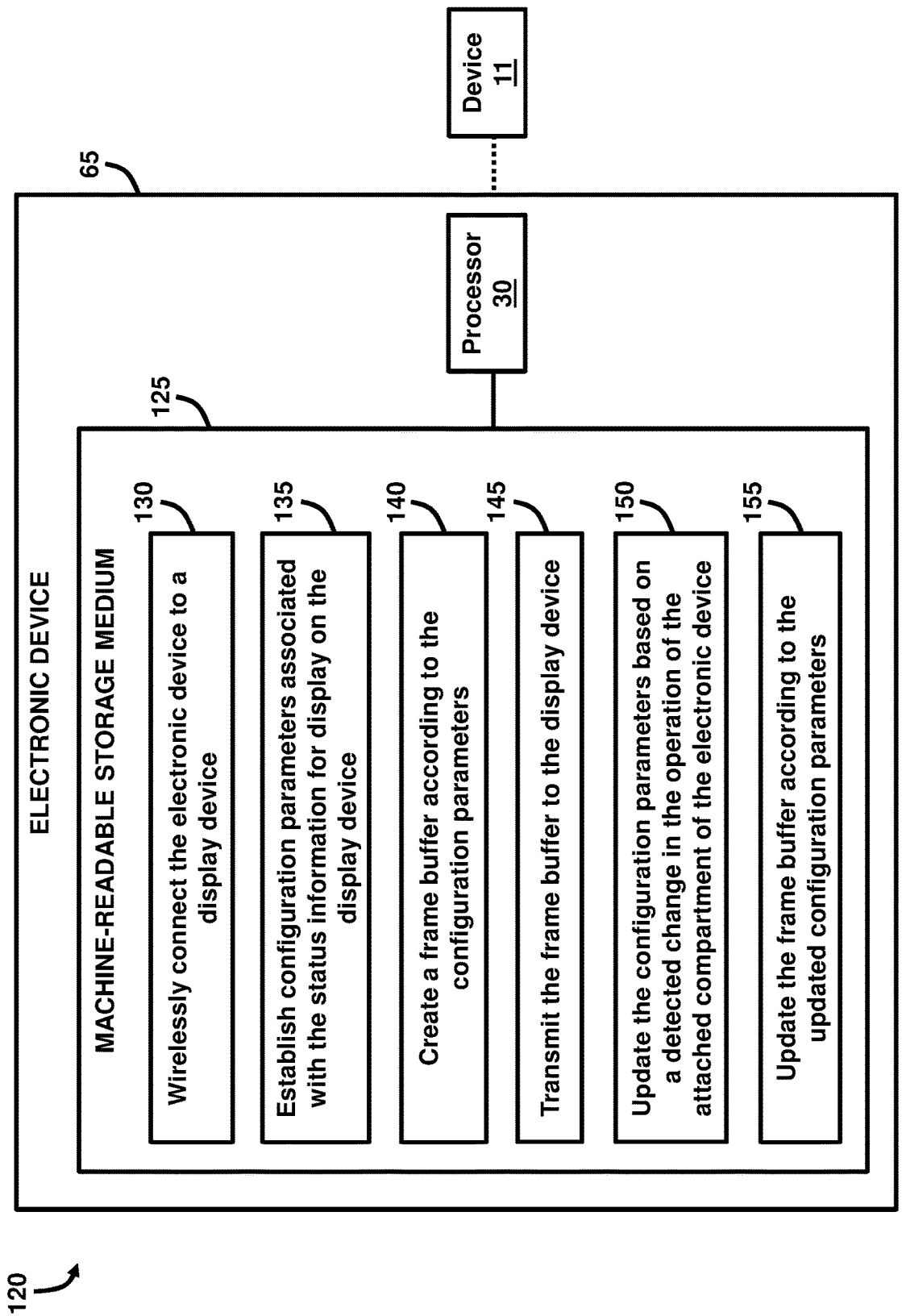
FIG. 14 is a block diagram illustrating a system to display status information of an electronic device using computer-executable instructions, according to an example.

FIG. 14, with reference to FIGS. 1 through 13, illustrates an example system 120 to display status information of an electronic device 65. In the example of FIG. 14, the electronic device 65 includes the processor 30 and a machine-readable storage medium 125. Processor 30 may include a central processing unit, microprocessors, microcontroller, hardware engines, and/or other hardware devices suitable for retrieval and execution of instructions stored in a machine-readable storage medium 125. Processor 30 may fetch, decode, and execute computer-executable instructions 130, 135, 140, 145, 150, and 155 to enable execution of locally-hosted or remotely-hosted applications for controlling action of the electronic device 65. The remotely-hosted applications may be accessible on one or more remotely-located devices; for example, communication device 66. For example, the communication device 66 may be a computer, tablet device, smartphone, or remote server. As an alternative or in addition to retrieving and executing instructions, processor 30 may include one or more electronic circuits including a number of electronic components for performing the functionality of one or more of the instructions 130, 135, 140, 145, 150, and 155.

The machine-readable storage medium 125 may be any electronic, magnetic, optical, or other physical storage device that stores executable instructions. Thus, the machine-readable storage medium 125 may be, for example, Random Access Memory, an Electrically-Erasable Programmable Read-Only Memory, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the machine-readable storage medium 125 may include a non-transitory computer-readable storage medium. The machine-readable storage medium 125 may be encoded with executable instructions for enabling execution of remotely-hosted applications accessed on the one or more remotely-located devices 66.

In an example, the processor 30 of the electronic device 65 executes the computer-executable instructions 130, 135, 140, 145, 150, and 155. For example, connecting instructions 130 may wirelessly connect the electronic device 65 to a display device 40. The display device 40 is to display status information 45 associated with an operation of an attached compartment 50 of the electronic device 65. The wireless connection may occur through any suitable wireless communication protocol such as Bluetoothe, TCP/IP, and instant messaging protocols, for example. In an example, the wireless connection may utilize Bluetooth® low energy protocols. Establishing instructions 135 may establish configuration parameters 110 associated with the status information 45 for display on the display device 40. The status information 45 may refer to the operational status, health, inventory, or any other information that relates to the operation and/or functioning of the electronic device 65. Creating instructions 140 may create a frame buffer 85 according to the configuration parameters 110. In an example the frame buffer 85 may be a data object created using any suitable application programming interface (API) used for rendering graphics.

Transmitting instructions 145 may transmit the frame buffer 85 to the display device 40. The transmission of the frame buffer 85 from a processor 30 to the display device 40 may occur wirelessly or through a wired connection. Updating instructions 150 may update the configuration parameters (e.g., updated configuration parameters 110a) based on a detected change in the operation of the attached compartment 50 of the electronic device 65. The configuration parameters 110a and updated configuration parameters 110a may be provided as firmware updates in the processor 30, according to an example. Updating instructions 155 may update the frame buffer (e.g., updated frame buffer 85x) according to the updated configuration parameters 110a. The frame buffer 85 and updated frame buffer 85x may be provided as firmware updates in the processor 30, according to an example.

The instructions 130, 135, 140, 145, 150, and 155, when executed, further cause the processor 30 to transmit the updated frame buffer 85x to the display device 40. The transmission of the updated frame buffer 85x to the display device 40 allow the display device 40 to display the latest and most updated version of the updated configuration parameters 110a associated with the attached compartment 50 of the electronic device 65. Additionally, the instructions 130, 135, 140, 145, 150, and 155, when executed, further cause the processor 30 to update the configuration parameters (e.g., into updated configuration parameters 110a) based on satisfying a predetermined incremental threshold 115 in the detected change in the operation of the attached compartment 50 of the electronic device 65. The predetermined incremental threshold 115 may be selected accordingly to any suitable threshold amount, percentage, or any other objective or subjective manner of determining a threshold in an incremental manner.

Figure 15:
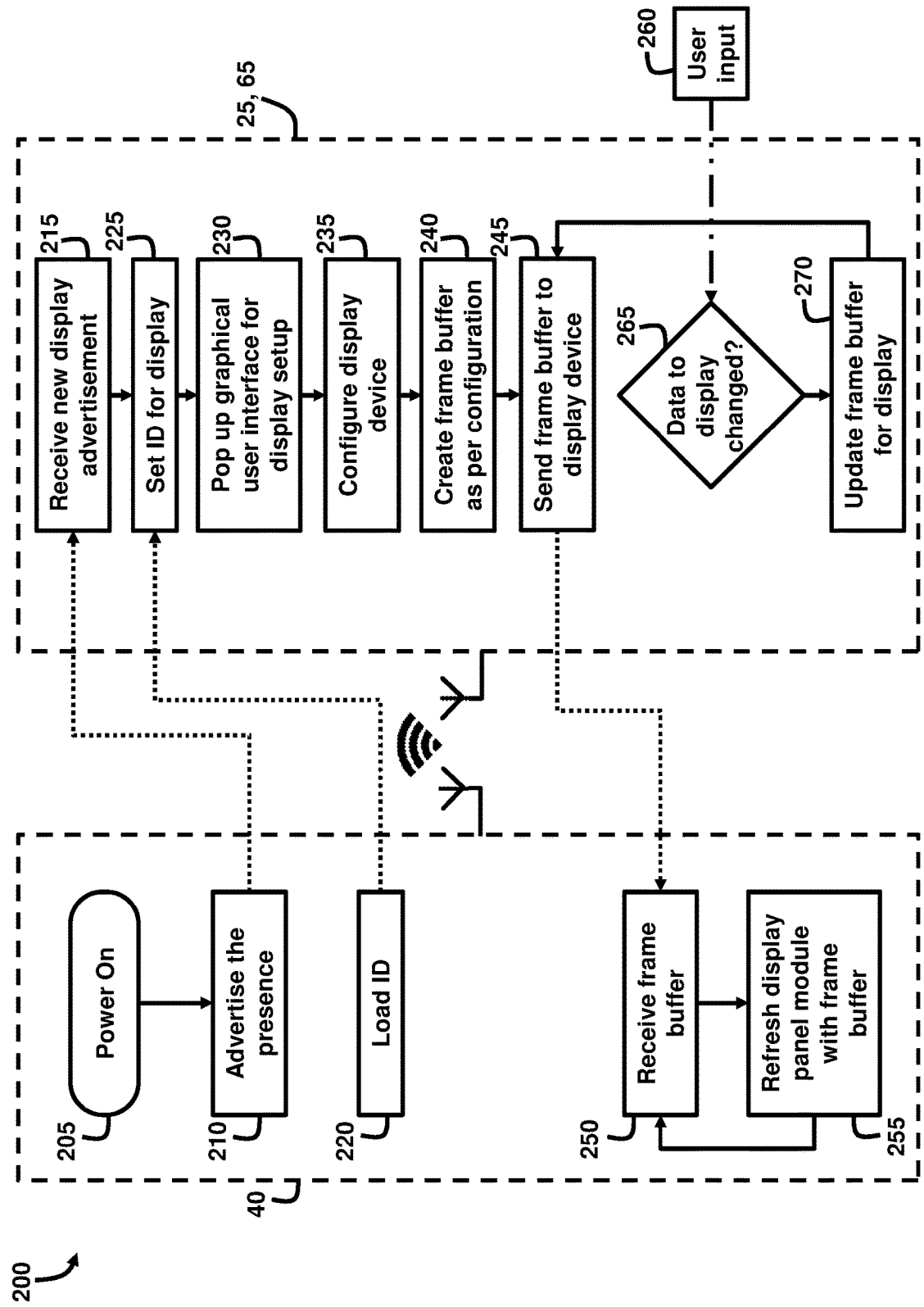
FIG. 15 is a flow diagram illustrating a method of update a frame buffer on a display device, according to an example.

FIG. 15, with reference to FIGS. 1 through 14, is an example flow diagram illustrating a method 200 of updating a frame buffer 85 on a display device 40 through the wireless interaction with a host device 25 or electronic device 65. Block 205 provides that the display device 40 is in a power on mode of operation. In an example, the display device 40 may be in a continuous power on mode so long as the host device 25 or electronic device 65 is powered on. In another example, the display device 40 may be in a limited power on ode when the host device 25 or electronic device 65 is powered on. In still another example, the display device 40 may comprise a button or switch to provide the power on functionality. Block 210 provides that the display device 40 communicatively advertises its presence to the host device 25 or electronic device 65. In this regard, the display device 40 is ready to be wirelessly paired to the host device 25 or electronic device 65. Block 215 provides that the host device 25 or electronic device 65 receives the new display advertisement from the display device 40, and as such the host device 25 or electronic device 65 becomes aware of the presence of the display device 40. Block 220 provides that the display device 220 loads an identification code 105 associated with the display device 220. Each display device 220 has its own unique identification code 105, which is pre-programmed into the display device 220. Block 225 provides that the host device 25 or electronic device 65 sets the identification code 105 for display on a user interface 66 of the host device 25 or electronic device 65. Block 230 provides that the user interface 66 may comprise a pop up graphical user interface to allow a user to input the display setup instructions for the display device 40.

Block 235 provides for configuring the display; e.g., inputting the type, name, etc. associated with the display device 40. In an example, the inputting of the data may occur through a series of drop-down menus with open-ended questions or with guided questions/responses. Block 240 provides for creating a frame buffer 85 according to configuration parameters 110. Block 245 provides that the host device 25 or electronic device 65 sends the frame buffer 85 to the display device 40. Block 250 provides that the display device 40 receives the frame buffer 85. In an example, the display device 40 may receive the frame buffer 85 in a low power mode of operation; e.g., in a lower power mode of operation compared with the standard power mode of operation of the display device 40 when the display device 40 is displaying the different data fields $95_1 \ldots 95_x, 96_1 \ldots 96_y$, for example. Block 255 provides for refreshing the display device 40 with the frame buffer 85. In some examples, the display device 40 may be any of an electronic ink display panel 55a, a light emitting diode display panel 55b, and a liquid-crystal display panel 55c.

Block 260 provides for any user input or interaction with the host device 25 or electronic device 65 that causes a change to the data; e.g., status information 45 that is displayed data fields $95_1 \ldots 95_x, 96_1 \ldots 96_y$, of the display device 40. Block 265 determines whether the data; e.g., status information 45 has been changed based on the currently displayed data on the display device 40. If the data has been changed, then block 270 provides that the host device 25 or electronic device 65 updates the frame buffer (e.g., updated frame buffer 85x) for transmission to the display device 40 and for display on the display device 40.

The following are examples of implementing the techniques provided in accordance with the descriptions above. A user may utilize the systems 100, 120 and method 200 in the following non-limiting example situations in which the display device 40 attached to the compartment 50 may provide details regarding the status information 45 of consumables, etc. contained within, or associated with, the compartment 50. As used below, the display device 40 may also refer to the first display device 40a and second display device 40b.

Example use situation (1) A user approaches the host device 25 or electronic device 65 and quickly determines what media size/type is loaded in a particular compartment 50; e.g., a tray, bin, etc., and can determine the status of the consumables in that compartment 50; e.g., empty status, jam status, etc. Rather than the conventional approach of browsing through a common user interface 66 of the host device 25 or electronic device 65 in order to locate the information pertaining to a particular tray and then physically looking for that particular tray on the host device 25 or electronic device 65, the display device 40 allows for quick and efficient identification of the specific compartment 50 and identification of the status information 45 related to that compartment 50.

Example use situation (2) A user approaches the host device 25 or electronic device 65 and is able to quickly determine which compartment 50 their print job was delivered to. Conventional approaches may require a user to thumb through all the print jobs in the various output bins to find that particular user's print job, whereas use of the display device 40 as provided by the examples herein allows a user to read the display device 40 attached to each compartment 50; e.g., output bin, etc., see the user's job name and bin name, and quickly retrieve the print medium that is output. Also, a user can quickly scan multiple printers; e.g., host devices 25 or electronic devices 65, that are arranged in a row until he/she sees the output bin with the job name in order to quickly identify the printer that was used to perform the print job.

Example use situation (3) A compartment 50 may be a tray, and the tray is inserted in the middle of a stack of trays and the user wants the trays to be automatically and conveniently re-numbered according to a particular sequence. Conventionally, a user would have to manually re-number the tray; e.g., with stickers or notes, etc. Conversely, the display device 40 permits the tray information and number to be automatically updated and displayed on the display device 40, which is attached to the tray; e.g., compartment 50. In this scenario, a user may have previously installed the display devices 40 on all existing trays on a printer, for example, and the display devices 40 may be paired with the trays and are displaying the correct tray information. The user then acquires the new tray to be installed on the printer. The user can attach a new display device 40 to the new tray. Thereafter, the user can re-boot the printer. This allows the printer firmware to automatically detect; e.g., through Bluetooth® low energy communication protocols, the presence of the new display device 40. The new display device 40 may then be paired to the new tray hardware via the user interface 66 of the printer. Then, the printer firmware automatically sends updated status information 45; e.g., tray information to all display devices 40 including the newly added display device 40.

Example use situation (4) A user approaches the host device 25 or electronic device 65 and is able to quickly determine the status information 45 of the consumables in a compartment 50; e.g., the inventory level, supply level, etc. of the consumables. In the conventional solutions, a user may have to browse to the supplies status menu/screen/page to ascertain the supplies information, whereas the display device 40 allows a user to quickly ascertain the status information 45 by reading the data fields $95_1 \ldots 95_x$, $96_1 \ldots 96_y$, attached to the compartment 50 or multiple compartments; e.g., first compartment 50a, second compartment 50b, etc.

Example use situation (5) There is a print medium jam that the user wants to remove. Typical solutions require a user to follow auto-navigational instructions on a single, common user interface of the printer and open the corresponding correct doors and compartments. Often, a user may have to access several doors and compartments in order to search for the jammed print medium. However, with a display device 40 being attached to each compartment 50 in various locations on the host device 25 or electronic device 65, the appropriate display device 40 can show exactly where the print medium jam is occurring, which enables the user to quickly access the correct compartment 50; e.g., door, in order to clear the jam.

Example use situation (6) A user may be an information technology (IT) support technician and may want to change the IP address, name, etc. of the host device 25 or electronic device 65. In the conventional solutions, it is common for IT technicians to place stickers or notes on printers showing the hostname/IP information, etc. These stickers and notes must be re-printed and re-attached whenever the printer configuration information changes. Moreover, these stickers and notes may become easily detached and lost. Conversely, the display device 40 automatically updates the status information 45 based on firmware updates, etc. to provide the latest configuration information, etc. associated with the host device 25 or electronic device 65.

Example use situation (7) A user may be a service technician that wants to remove a print medium jam from the host device 25 or electronic device 65 that has been powered off. The conventional approach typically involves the service technician searching all doors/trays for the jam or powering off/on the printer, wait for the printer to re-boot, and then use the auto-navigation menus on the user interface to identify the source and location of the jam. However, the display device 40 allows a service technician to quickly and easily locate the source of the print medium jam by reading the display device 40.

In the various example use situations described above, in the conventional solutions, if the device; e.g., printer, is in a sleep mode, then the user must wake the device, wait for the device to wake, and then proceed through the auto-navigational menus in the common user interface to access the required information. Conversely, the display device 40 provided by the examples herein does not require that the user has to wait for the host device 25 or electronic device 65 to wake since the display device 40 is independently powered by the power source 15 and does not rely on the host device 25 or electronic device 65 to be on or to power the display device 40. Accordingly, the display device 40 may always be on to provide the latest status information 45.

Figure 16:
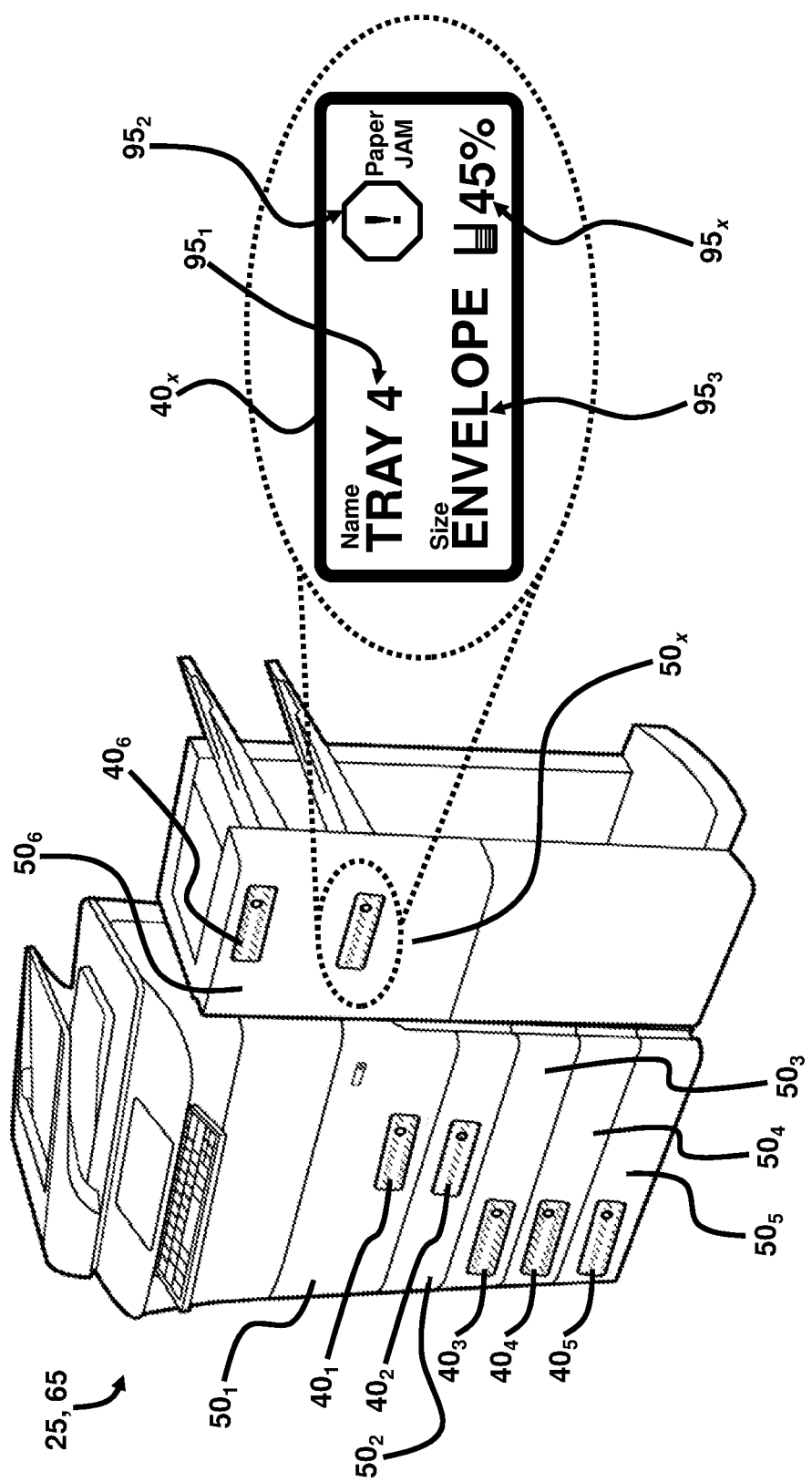
FIG. 16 is a schematic diagram illustrating a host device or electronic device with attached display devices, according to an example.

FIG. 16, with reference to FIGS. 1 through 15, is a schematic diagram illustrating a host device 25 or electronic device 65 with multiple attached display devices $40_1 \ldots 40_x$, according to an example. As shown, the display devices $40_1 \ldots 40_x$, are attached to the external portions of the compartments $50_1 \ldots 50_x$, respectively. Each of the display devices $40_1 \ldots 40_x$, may display multiple data fields $95_1 \ldots 95_x$. As described above, the data fields $95_1 \ldots 95_x$, may provide status information 45 related to the respective compartments $50_1 \ldots 50_x$.

The examples described herein provide an information display system 10 that wirelessly pairs a display device 40 to a host device 25 or electronic device 65 to provide a display for users who are viewing the display device 40. The examples provide a low power solution to enable displaying status information 45 including current status, health, etc. regarding a particular compartment 40 such as a tray or consumable. The display device 40 may be spatially located with hardware it represents so that users can easily access the status information 45 and correlate it to the compartment 50; e.g., tray/bin/consumable. For example, each compartment 50 could have its own attached display device 40. Moreover, the host device 25 or electronic device 65 can have an arbitrary number of display devices 40 attached thereto at various locations and configurations. The examples described herein allow for quick and efficient display of the status information 45 associated with each compartment 50, which provides for a more efficient user experience. Because the display device 40 is attached to the exterior of the host device 25 or electronic device 65, it allows for convenient accessibility of the status information 45. Additionally, the display device 40 may be added to existing systems without requiring significant hardware changes to the host device 25 or electronic device 65.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A display system comprising:
   a power source;
   a communication transceiver operatively connected to the power source and wirelessly linked to a host device;
   a processor to receive computer-executable data signals from the host device through the communication transceiver; and
   a display device to receive the data signals from the processor and display status information of an attached compartment of the host device, wherein the display device is to consume power from the power source only when the data signals are updated on the display device.

2. The display system of claim 1, wherein the display device comprises any of an electronic ink display panel, a light emitting diode display panel, and a liquid-crystal display panel.

3. The display system of claim 1, wherein the status information comprises programmable information associated with an operation of the attached compartment of the host device.

4. The display system of claim 1, wherein the power source is inductively charged by the host device.

5. An electronic device comprising:
   a first compartment to house a first component for operating the electronic device;
   a second compartment to house a second component for operating the electronic device;
   a host processor to detect an operational status of the first compartment and the second compartment;
   a first processor wirelessly connected to the host processor and coupled to the first compartment, wherein the first processor is to receive a first signal from the host processor containing first operational status information associated with the first compartment;
   a first display device operatively connected to the first processor, wherein the first display device is to display the first operational status information associated with the first compartment;
   a second processor wirelessly connected to the host processor and coupled to the second compartment, wherein the second processor is to receive a second signal from the host processor containing second operational status information associated with the second compartment; and
   a second display device operatively connected to the second processor, wherein the second display device is to display the second operational status information associated with the second compartment, wherein the first display device or the second display device is to consume power from a power source only when the first signal or the second signal is updated on the first display device or the second display device.

6. The electronic device of claim 5, wherein the first processor is to receive a first frame buffer containing a digital representation of the first operational status information from the host processor, and wherein the second processor is to receive a second frame buffer containing a digital representation of the second operational status information from the host processor.

7. The electronic device of claim 6, wherein the first processor is to refresh the first display device with the first frame buffer, and wherein the second processor is to refresh the second display device with the second frame buffer.

8. The electronic device of claim 5, wherein the first display device and the second display device are independently powered from one another.

9. The electronic device of claim 5, wherein the first display device and the second display device are programmable to display a predetermined number of data fields.

10. The electronic device of claim 9, wherein the first display device and the second display device are programmable to display different data fields from one another.

11. The electronic device of claim 5, wherein the first display device is detachably connected to the first compartment, and wherein the second display device is detachably connected to the second compartment.

12. A machine-readable storage medium comprising computer-executable instructions that when executed cause a processor of an electronic device to:
- wirelessly connect the electronic device to a display device, wherein the display device is to display status information associated with an operation of an attached compartment of the electronic device;
- establish configuration parameters associated with the status information for display on the display device;
- create a frame buffer according to the configuration parameters;
- transmit the frame buffer to the display device;
- update the configuration parameters based on a detected change in the operation of the attached compartment of the electronic device; and
- update the frame buffer according to the updated configuration parameters, wherein the display device is to consume power from a power source only when data signals are updated on the display device.

13. The machine-readable storage medium of claim 12, wherein the instructions, when executed, further cause the processor to transmit the updated frame buffer to the display device.

14. The machine-readable storage medium of claim 12, wherein the instructions, when executed, further cause the processor to update the configuration parameters based on satisfying a predetermined incremental threshold in the detected change in the operation of the attached compartment of the electronic device.

* * * * *